United States Patent [19]
Schroeder et al.

[11] Patent Number: 4,902,416
[45] Date of Patent: Feb. 20, 1990

[54] MEMBRANE SEPARATION DEVICE

[75] Inventors: Lawrence R. Schroeder, Danville; Terrence L. Caskey, Concord, both of Calif.

[73] Assignee: The Dow Chemical Company, Midland, Mich.

[21] Appl. No.: 303,505

[22] Filed: Jan. 26, 1989

Related U.S. Application Data

[63] Continuation of Ser. No. 123,088, Nov. 20, 1987, abandoned.

[51] Int. Cl.[4] .............................................. B01D 13/00
[52] U.S. Cl. ........................... 210/321.67; 210/321.74; 210/321.83
[58] Field of Search .............. 210/356, 321.67, 321.74, 210/321.83, 929

[56] References Cited

U.S. PATENT DOCUMENTS

| | | | |
|---|---|---|---|
| 3,870,637 | 3/1975 | Miyoshi et al. | 210/243 |
| 3,902,490 | 9/1976 | Jacobs et al. | 210/929 X |
| 4,141,836 | 2/1979 | Schael | 210/321 |
| 4,207,192 | 6/1980 | Coplan et al. | 210/321 |
| 4,240,907 | 12/1980 | Bentley | 210/646 |
| 4,271,900 | 6/1981 | Reitz | 165/162 |
| 4,323,457 | 4/1982 | Sun et al. | 210/645 |
| 4,368,124 | 1/1983 | Brumfield | 210/321 |
| 4,430,219 | 2/1984 | Kuzumoto et al. | 210/321 |
| 4,500,430 | 2/1985 | Dasgupta | 210/638 |

OTHER PUBLICATIONS

Charles T. Blaisdell and Karl Kammermeyer, "Counter-Current Gas Separation", *Chemical Engineering Science*, 1973, vol. 28, pp. 1249–1255.

*Primary Examiner*—Frank Spear

[57] ABSTRACT

This invention relates to a hollow fiber membrane device which can accommodate large changes in fiber dimension due to fiber swelling or contraction during operation.

16 Claims, 5 Drawing Sheets

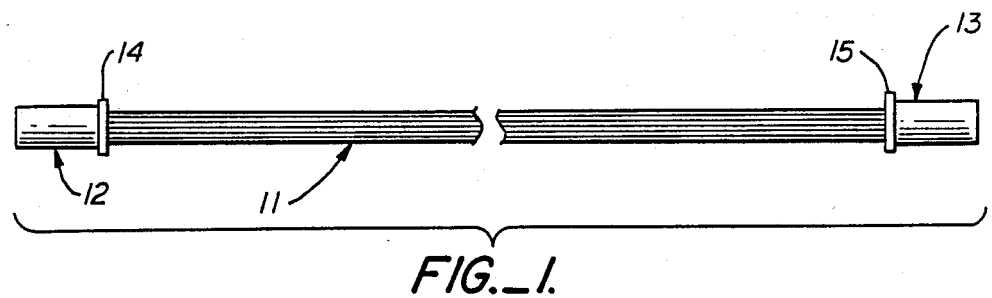
FIG._1.
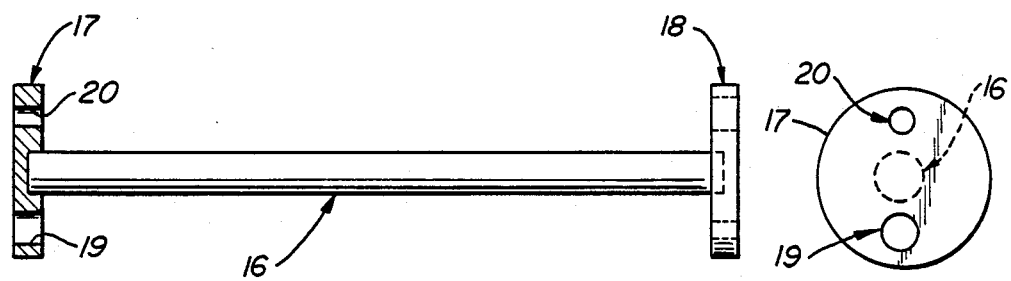
FIG._2.   FIG._3.
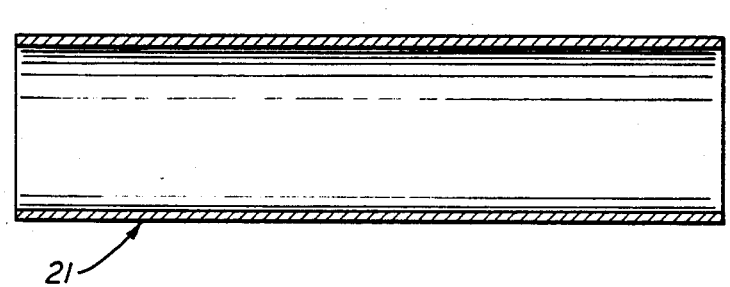 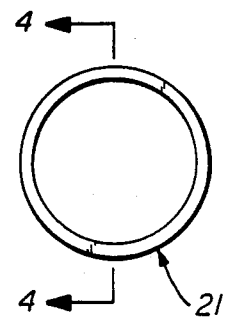
FIG._4.   FIG._5.

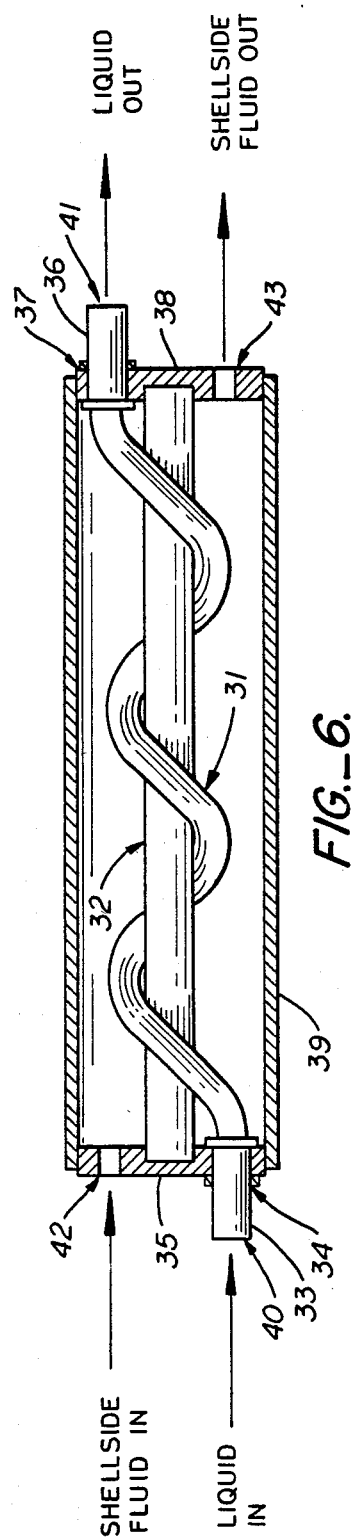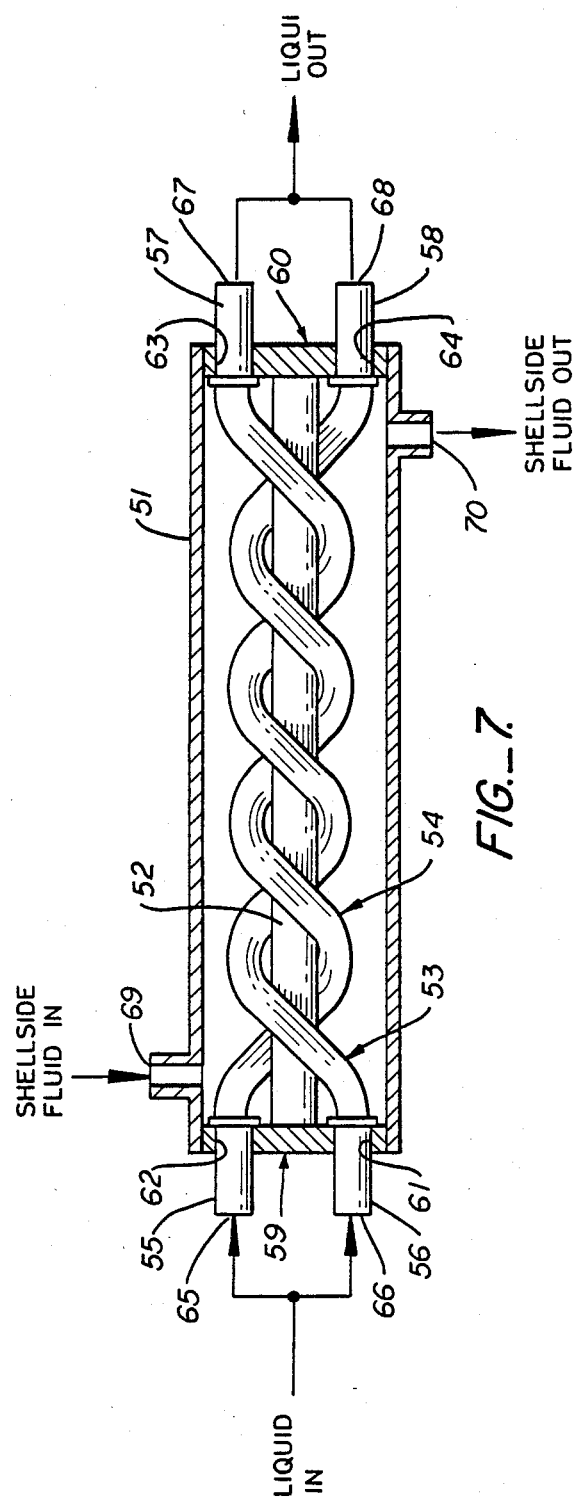

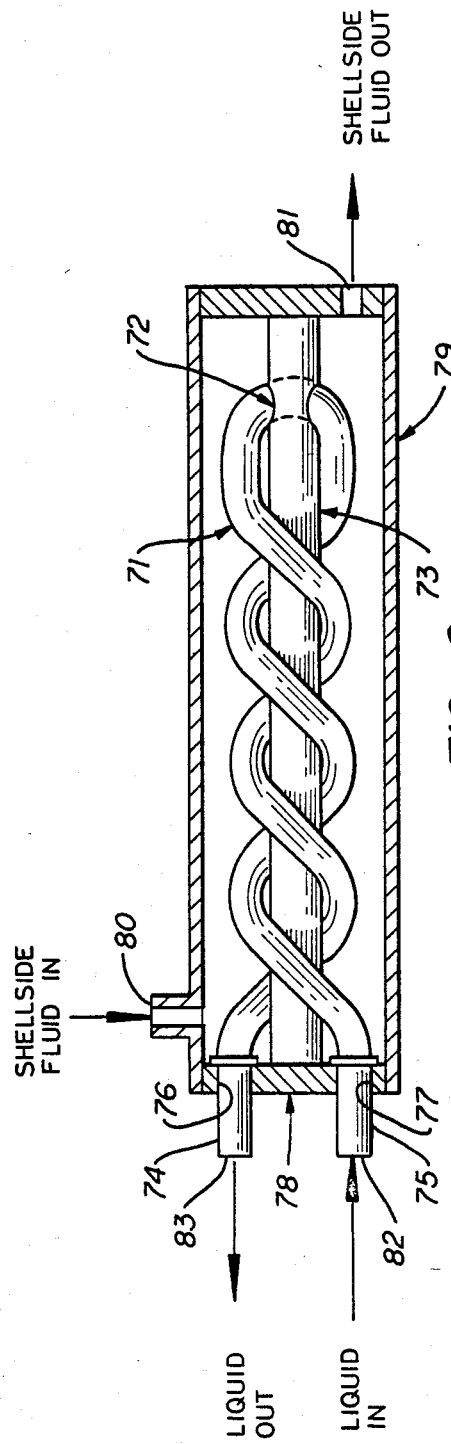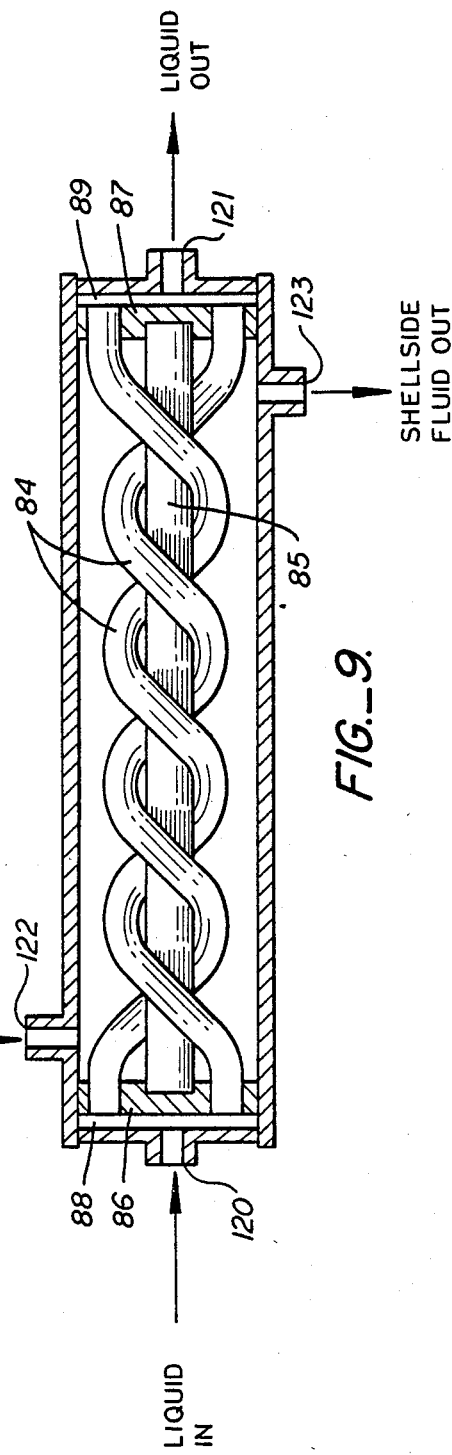

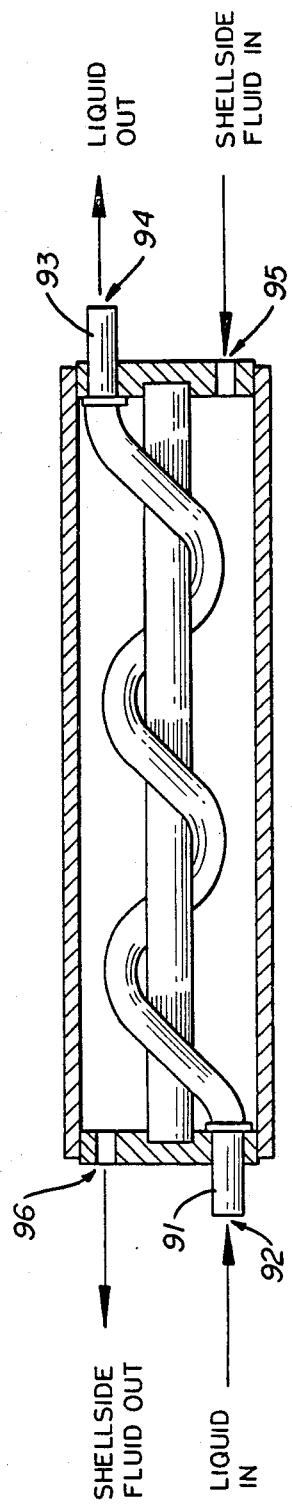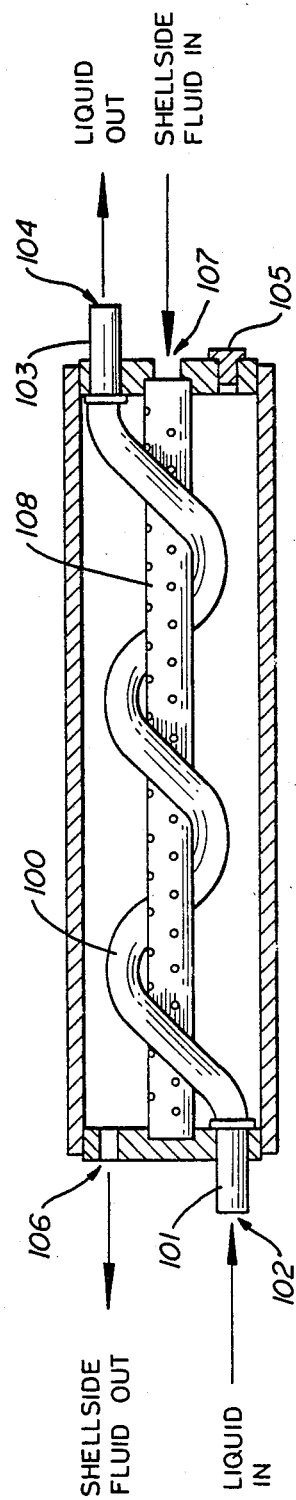

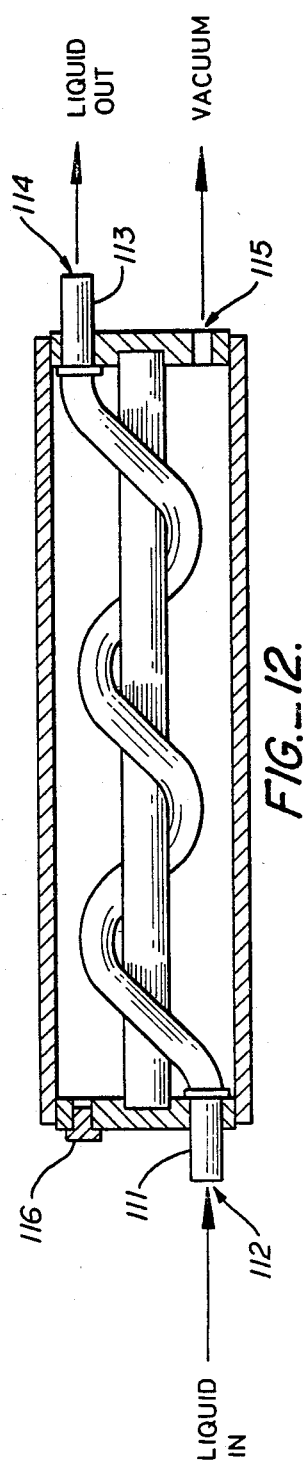
FIG._12.
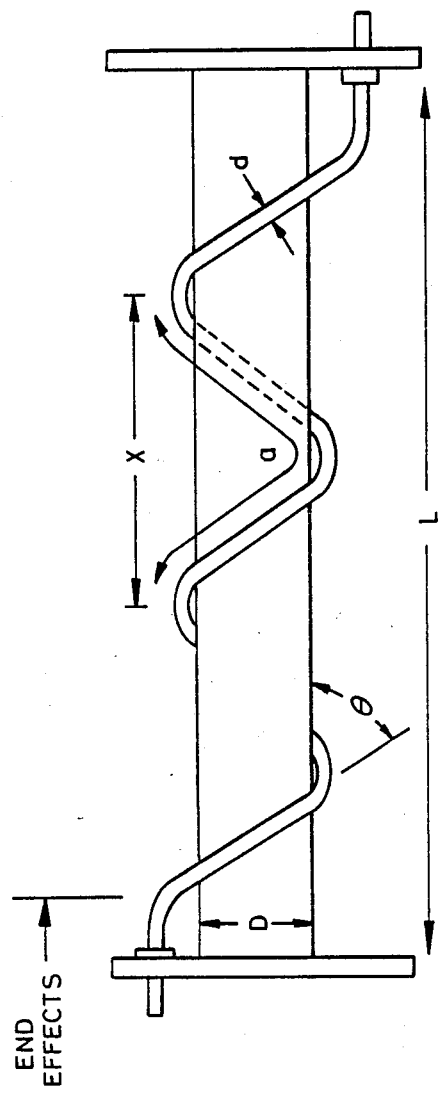
FIG._13.

MEMBRANE SEPARATION DEVICE

CROSS-REFERENCE TO RELATED APPLICATION

This is a continuation of application Ser. No. 123,088, filed Nov. 20, 1987, now abandoned.

BACKGROUND OF THE INVENTION

This invention relates to a membrane separation device. In particular, this invention relates to a hollow fiber membrane device for liquid separations designed to accommodate significant changes in fiber dimensions due to fiber swelling or contraction during operation.

Membrane devices are used in a wide variety of separation applications such as reverse osmosis, ultrafiltration, microfiltration, dialysis, and pervaporation. Different membrane device configurations are described in the art, including plate and frame, tubular, spiral wound, and hollow fiber configurations. The hollow fiber configuration is generally preferred because a higher surface area per unit volume of device can be obtained, resulting in increased device productivity over other configurations. Furthermore, hollow fibers are generally self-supporting so the hollow fiber configuration does not require the extensive membrane supporting means and flow channel spacers used in plate and frame or spiral configurations.

Hollow fiber membrane devices are typically fabricated according to one of two basic designs, parallel wrapped or bias wrapped. The typical parallel wrapped hollow fiber device consists of a plurality of hollow fibers arranged in parallel in an axial direction, optionally about a core, with the ends of the hollow fibers embedded in at least one tubesheet to form a bundle. The bundle is inserted into a case against which the tubesheet(s) seals so as to define two fluid regions, one for the permeate and one for the non-permeate. Fluid flow between the two regions is accomplished by fluid selectively permeating through the membranes. The case has means for introducing feed to the membranes and means for removing permeate and non-permeate from the membranes. Examples of such parallel wrapped devices are described in U.S. Pat. Nos. 3,690,465; 4,220,535; 4,265,763; 4,271,900; 4,315,819; 4,367,139. The typical bias wrapped device consists of a plurality of hollow fibers wrapped in a helical or spiral fashion about a core to form multilayers of criss-crossed fibers. A bundle is thus formed with at least one end of the bundle embedded in a tubesheet. The bundle is fitted into a case against which the tubesheet(s) seals, forming two separate fluid regions. The case contains menas of introducing the feed and withdrawing the permeate and non-permeate. Examples of such bias wrapped devices are described in U.S. Pat. Nos. 3,422,008 and 4,430,219.

In the conventional hollow fiber devices hereinbefore described, the fibers are wrapped under sufficient tension to hold the fibers relatively fixed in place during operation. In applications in which the hollow fibers are contacted with a liquid which causes significant dimensional changes in the fibers, the hollow fibers may crimp and/or break due to dimensional changes caused by swelling or contraction. Changes in fiber diameter of up to about 100 percent and changes in fiber length of up to about 100 percent are not uncommon when the fibers are contacted with a fluid which swells or contracts the fibers. Furthermore, reduced flow rates within the follow fibers and high pressure drops down the hollow fibers may result from the swelling shut of the fibers, since both the inside and outside wall diameters may change in dimension.

A device design which will accommodate large changes in fiber diameter and length without crimping or breaking of fibers is needed.

SUMMARY OF THE INVENTION

This invention relates to a hollow fiber membrane device comprising (1) a plurality of hollow fiber membranes formed into at least one non-random bundle wherein the membranes are capable of separating at least one of the components from a liquid feed mixture;

(2) at least one tubesheet comprised of a thermoplastic or thermoset material wherein the end(s) of the hollow fiber bundle(s) are embedded in the tubesheet(s);

(3) at least one core wherein at least one hollow fiber bundle is wrapped in a spiral fashion about at least one core in such a manner that the bundle(s) may expand or contract without substantial damage to the fibers;

(4) a means for introducing the feed stream into the membrane device;

(5) a means for removing the non-permeate from the membrane device; and (6) a means for removing the permeate from the membrane device.

This invention accommodates large changes in fiber dimensions caused by swelling or contraction of fibers without fiber crimping or breakage.

BRIEF DESCRIPTION OF THE FIGURES

FIG. 1 relates to a hollow fiber bundle.
FIGS. 2 and 3 relate to a core assembly.
FIGS. 4 and 5 relate to a case.
FIG. 6 relates to a preferred hollow fiber device which is the subject of this invention.
FIGS. 7, 8, and 9 relate to alternate embodiments of hollow fiber membrane devices which are the subject of this invention.
FIGS. 10, 11, and 12 illustrate operation of the device under alternate flow configurations.
FIG. 13 illustrates various device design parameters.

DETAILED DESCRIPTION OF THE INVENTION

The invention relates to a hollow fiber membrane device which can accommodate significant changes in fiber dimensions when contacted with a liquid feed. Fiber diameter changes up to about 100 percent, more preferably up to about 60 percent, may be accommodated through use of this invention. Fiber longitudinal changes up to about 100 percent, more preferably up to about 80 percent may be accommodated by use of this invention.

The size of the hollow fibers used in the membrane device will be dependent on the type of separation application, surface area requirements, necessary fiber strength, tolerable pressure drop, and the like. The outside diameter of the hollow fibers is preferably from about 100 to about 1000 microns, more preferably from about 250 to about 750 microns. The hollow fiber membranes preferably have a wall thickness of about 20 to about 200 microns, more preferably about 30 to about 100 microns.

The hollow fibers are formed into a bundle and the ends bound together with one or more tubesheets. The tubesheet material used in the device may be any thermoplastic or thermoset material which may be bonded to the fiber and which is stable under the conditions of use. The fibers are preferably formed into bundles of about 5 to about 30,000 fibers each, more preferably from about 50 to about 1500 fibers each. The size of the hollow fiber bundle will be dependent upon the fiber size, number of fibers in the bundle, and the fiber packing density. Preferably the bundle diameter will be less than about 1½ inches, more preferably less than about 1 inch.

The tubesheet material may be applied to the fibers by any convenient means known to one skilled in the art, such as by dipping the ends of the fiber bundles in the tubesheet material or by potting the tubesheets onto the ends of the fiber bundles by use of a mold. The tubesheet may need to be machined to the proper dimensions prior to assembly of the membrane device. If a mold is used, the mold may be sized to account for shrinkage during curing of the tubesheet so that machining prior to assembly of the device is unnecessary. The tubesheet size is preferably less than about 1½ inches in diameter.

The core(s) provides support for the hollow fiber bundle(s). The core(s) may have a circular or noncircular cross-section. The core(s) preferably has a circular cross-section. The core assembly preferably consists of a solid rod, a tube, or a perforated tube to which are optionally connected end plates at either end of the core. The end plates may be circular or non-circular, depending on the case shape. The end plates are preferably circular. The diameter of the core should be sized so as to avoid damage to the fibers when wrapped about the core and the length of the core should be sized so as to provide for expansion and contraction of the fiber bundles during use. The core diameter is preferably from about ⅛ to about 3 inches, more preferably from about ½ to about 1½ inches. The core length is preferably from about 15 to about 90 percent of the length of the fiber bundle, more preferably from about 50 to about 70 percent of the length of the fiber bundle. Each end plate has a means for securing the fiber bundle and optionally contains inlet/outlet means for a shellside fluid. The core assembly may be fabricated from any material which possesses sufficient mechanical strength and is not deleteriously affected by contacting with the fluids of use. Examples of suitable core materials include metal, glass, or plastic.

The hollow fibers are formed into a bundle, with at least one tubesheet affixed to an end of the bundle, and then the bundle is wrapped in a spiral fashion about at least one core. The bundle may optionally be passed through an aperture located at one end of the core so that a U-shaped spiral arrangement is obtained. In such a U-shaped arrangement, both ends of the fiber bundle are located at the same end of the membrane device. In another embodiment, multiple fiber bundles may be spirally wrapped about the core, with the ends of the bundles embedded in one or more tubesheets. In still another embodiment, the device has multiple cores about which one or more fiber bundles are arranged. Optional support means may connect the multiple cores.

The tubesheets provide the means for obtaining fluid access to the inside of the hollow fibers. The tubesheets are fitted into apertures in the end plates in a manner which forms fluid tight seals. Alternatively, the hollow fiber bundle or bundles may be arranged in a spiral fashion about the core and then the tubesheets affixed to the ends of the bundle or bundles and core. The tubesheet thus may replace the removable end plates.

The case serves to define the shellside fluid flow region and to protect the membrane device from the outside environment. A case is optional when the feed liquid is introduced down the fiber bores; however, a case is preferable. The case is sized to permit swelling or contraction of the fibers without substantial damage to the fibers. In one preferred embodiment, the case is tubular in shape with a circular core end plate located at either end of the case forming a fluid tight vessel. The tubesheet(s) of the fiber bundle(s) are fitted within apertures in the end plates in a manner which forms a fluid tight seal. In another embodiment, the case fits about the tubesheet(s) of the fiber bundle to form a fluid tight seal. Inlet and outlet ports for the shellside fluid may be located in the end plates or in the side of the case. The case may be fabricated from any material which is not deleteriously affected under use conditions. Examples of suitable case materials include glass, metal, and plastic.

Several of the device design parameters are interrelated so that setting one of the parameters determines other parameters. The relationship between design parameters for a single bundle, non-U-shaped configuration in which the feed liquid swells the fibers, can be approximated by a set of equations. The equations assume a circular fiber bundle shape of diameter d with the bundle diameter being small in comparison to the bundle length 1. The equations are highly idealized and neglect to account for end effects in which the ends of the fiber bundle are not at an angle as depicted in FIG. 13. In addition, the equations assume a constant wrap angle, which may not be strictly true in the case of an actual device.

The relationship between the length of a fiber bundle, 1, and the length of the core, L, is determined by the wrap angle, $\theta$, as defined by Equation 1:

$$L = 1 \cos\theta \qquad \text{Equation 1}$$

The wrap angle, $\theta$, and core diameter, D, also determine the spacing between wraps, x, and the length of the fiber bundle required to make a single wrap, a, as defined by Equations 2 and 3:

$$x = \frac{\pi D}{\tan\theta} \qquad \text{Equation 2}$$

$$a = \frac{\pi D}{\sin\theta} \qquad \text{Equation 3}$$

The maximum wrap angle, $\theta$max., occurs when adjacent wraps of the bundle are touching and is approximated by Equation 4:

$$\theta_{max.} = \tan^{-1}\left[\frac{2(D + d)}{d}\right] \qquad \text{Equation 4}$$

The diameter and length of the fiber bundle and the diameter and length of the core will also be determined in part by other considerations such as surface area requirements, allowable pressure drop, and available space. The spacing between the wraps must allow adequate movement to relieve swelling or shrinking stresses. The adequacy of fluid contact on the outside of the fiber is also affected by the wrap spacing and bundle diameter.

The size of the case is determined by the amount of swelling expected. If the modules are installed to operate in a horizontal position, the hollow fibers will tend to "sag" to one side (the bottom) of the core. The case diameter must be large enough to accommodate the "sagging" of the swollen fiber. If s is the maximum longitudinal swelling expected, expressed as a fraction of the original fiber length, then the minimum inner diameter, ID min., for a circular case symmetrical about the core is approximated by Equation 5:

$$ID_{min.} = \frac{2D\sqrt{(1+s)^2 - \cos^2\theta}}{\sin\theta} - D + d' \qquad \text{Equation 5}$$

wherein d' is the diameter of the bundle after radial swelling. The actual case diameter should be sized larger than the minimum in order to account for non-idealities. Note that in an alternate embodiment of the device, the case may be situated asymmetrically about the core. An asymmetric case results in a smaller overall case diameter being required.

The hollow fiber membranes used in the device which is the subject of the invention may be fabricated from a variety of polymers. The polymer of choice will depend upon the membrane application. Permeability, separation factor, chemical resistance, temperature resistance, mechanical strength, and extrudability are some of the factors which determine the optimum polymer for a given application. Such polymers useful for membranes are well known and are described in the literature. See *The Polymer Handbook*, J. Brandrup and E. H. Immergut, John Wiley & Sons, 1975, incorporated herein by reference. The invention is particularly useful for membranes which swell significantly when contacted with the fluids to be separated. Examples of such preferred polymers include carboxy methyl cellulose; polyvinyl alcohol; sulfonated polyurea and salts thereof; aromatic polyamide; natural or synthetic rubbers including butyl or silicone rubber; and perfluorosulfonic acid or metal salts thereof. The perfluorosulfonic acid or a metal salt thereof preferably is comprised of units which correspond to Formula 1:

wherein
R$^1$ is independently in each occurrence fluorine or a C$_{1-10}$ perfluoroalkyl group;
R$^2$ is independently in each occurrence fluorine or a C$_{1-10}$ perfluoroalkyl group;
X is hydrogen or a metal;
z is an integer of from about 0 to about 6;
m is a positive real number of from about 5 to about 15;
p is an integer of from about 0 to about 16; and
q is an integer of from about 1 to about 16.

The tubesheet material used in the device may be any thermoplastic or thermoset material which may be bonded to the fiber and which is stable under the conditions of use. The fibers may be pretreated to enhance bonding with the tubesheet material. Examples of suitable tubesheet materials include artificial and natural rubbers, phenolaldehydes, acrylic resins, polysiloxanes, polyurethanes, fluorocarbons, and epoxy resins. Preferred tubesheet materials include epoxy resins, for example, the diglycidyl ether of bisphenol A reacted with amines or other curing agents. Optionally diluents, fillers and other modifiers may be used. Polyepoxide resins useful as tubesheet materials for the invention include glycidyl polyethers of polyhydric phenols.

Examples of polyhydric phenols are mononuclear phenols and polynuclear phenols. Polynuclear phenols include phenol-aldehyde condensation resins commonly known as novolac resins. Examples of mononuclear phenols include resorcinol, catechol, hydroquinone, phloroglucinal, and the like. Examples of polynuclear phenols include 2,2 bis(4-hydroxyphenyl)-propane-(bisphenol A), 4,4'-dihydroxy-benzophenone, 1,1-bis-(4-hydroxyphenyl)ethane, bis(2-hydroxynaphtyl)methane, 2,2-bis(4-hydroxyphenyl)butane, 4,4'-dihydroxy-phenyl phenyl sulfone and the like. Novolac resins include the condensation products of phenol-formaldehyde and the like.

The preparation of such resins is known in the art and is described in U.S. Pat. No. 2,935,488 and Lee and Neville, *Handbook of Epoxy Resins*, McGraw-Hill, 1967, incorporated herein by reference.

Preferred epoxy resins are those resins derived from bisphenol A, for example, diglycidyl ethers of bisphenol A. Such preferred resins are described by the Formula 2.

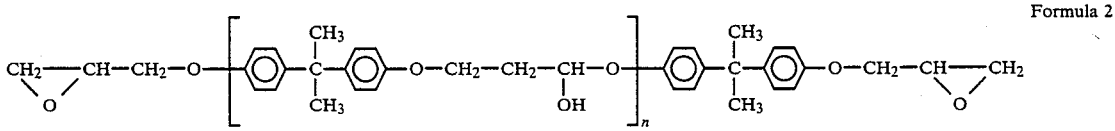

wherein n is a positive real number of between about 0 and 6, more preferably between about 0 and 4, most preferably from between about 0 and 1.5.

In a preferred embodiment where solvent resistance is required, the tubesheet is prepared from an epoxy novolac. Even more preferred is a mixture of an epoxy novolac and an epoxy resin of bisphenol A. The mixture preferably consists of between about 40 to 60 parts per weight of the epoxy novolac and between about 40 to 60 parts per weight of the epoxy resin of bisphenol A. Most preferably, a mixture of 50 parts of the epoxy novolac and 50 parts of the epoxy resin of bisphenol A is used.

The epoxy resin is cured with a curing agent such as a polyfunctional amine, for example an alphatic or aromatic diamine or a mixture or adduct of mixtures thereof, anhydrides, and 2,4-dialkylimidazoles. Examples of amines include m-phenylenediamine, methylenedianiline, mixtures of m-phenylenediamine and methylenedianiline, diaminodiphenylsulfone, 4-chlorpheylene diamine, and the like. Anhydrides include phthalic anhydride, nadic methylanhydride, and the like.

A preferred curing agent is a cyanoethylated polyamine such as ethylene diamine or other aliphatic polyamines modified with acrylonitrile. Especially preferred are the modified polyamines marketed by Pacific Anchor Chemical Corporation under the trademark ANCAMINE* 1636 AND ANCAMINE* 1922 diethylene glycol diamino propylether. Additives, fillers, and modifiers may be desirable in some applications.

An epoxy curing catalyst is optional. Any epoxy curing catalyst which enhances the curing of a polyglycidyl ether of a polyhydric phenol with the curing agent may be used. Preferably the catalyst is present in an amount between about 0.5 and 10 parts per hundred of resin, more preferably between about 0.5 and 4 parts of catalyst per hundred parts of resin, most preferably between about 1 and 2 parts per hundred parts of resin. Tertiary amines such as benzyldimethylamine, N,N,N',N,'tetramethylbutanediamine, dimethylaminopropylamine, N-metholmorpholine, N-triethylenediamine, and the like are preferred catalysts.

The feed liquid may be introduced on the shellside of the device. Alternately, in a preferred mode of operation of the device, the feed is introduced down the bores of the hollow fibers and the device may be operated under a variety of shellside flow configurations including co-current flow, counter-current flow, radial flow, and vacuum.

The operating temperature and pressure of the device is dependent upon the type of membrane used and the membrane separation method employed, for example, pervaporation, microfiltration, or ultrafiltration. The operating temperature should be below the temperature at which the membrane integrity is adversely affected, that is, below the softening or melting point of the polymer. The operating temperature preferably is less than about 95 degrees Celsius, more preferably less than about 60 degrees Celsius. Operating at ambient temperatures is often convenient. The operating pressure should be sufficient to pump the fluid to be treated down the bores of the hollow fibers, yet below the burst pressure of the hollow fibers. The burst pressure is dependent on the membrane material and the fiber size. Preferably the operating pressure is less than about 80 psig, more preferably less than about 60 psig, most preferably less than about 30 psig.

The device of this invention may be further illustrated by the following drawings.

FIGS. 1 through 5 illustrate sub-assemblies of a preferred device and FIG. 6 illustrates a preferred device fully assembled.

FIG. 1 illustrates a hollow fiber bundle. The hollow fiber bundle consists of hollow fibers (11) potted at either end into tubesheets (12 and 13). Each tubesheet is formed with a lip (14 and 15) which forms a means of sealing against the end plates.

FIG. 2 illustrates a core assembly. The core assembly consists of a solid rod, tube, or perforated tube (16) and an end plate at either end (17 and 18).

FIG. 3 illustrates an end plate (17) which contains an aperture for a tubesheet (19) and an inlet/outlet port (20) for the shellside fluid. The location of the core is shown (16).

FIG. 4 illustrates a cross-sectional view of the casing (21) and FIG. 5 illustrates an end view of the casing.

FIG. 6 illustrates a fully assembled device operated in a co-current flow mode. The device consists of a bundle of hollow fibers (31) wrapped in a spiral fashion about a core (32) wherein one tubesheet (33) is affixed and passes through an aperture (34) in an end plate (35) and the other tubesheet (36) is affixed and passes through an aperture (37) in an end plate (38) located at the opposite end of the device. The end plates are fitted into a case (39) to form a fluid tight vessel. One tubesheet (33) serves as an inlet for the feed liquid at (40) and the other tubesheet serves as an outlet for the non-permeate at (41). A port for the introduction of the shellside fluid (42) is contained in end plate (35) and a port for the withdrawal of the shellside fluid (43) and permeate is contained in end plate (38).

FIG. 7 illustrates an alternative embodiment of the device in which two hollow fiber bundles (53) and (54) are wrapped in a spiral fashion about a core (52) wherein the tubesheets (55), (56), (57), and (58) are affixed and pass through apertures (61), (62), (63), and (64) in the end plates (59) and (60). The feed liquid is introduced through tubesheets (55) and (56) at inlets (65) and (66). The non-permeate is withdrawn through tubesheets (57) and (58) at outlets (67) and (68). The shellside fluid is introduced through inlet port (69) located in the side of the case (51) and the shellside fluid and permeate is withdrawn through outlet port (70) located in the side of the case.

FIG. 8 illustrates an alternate embodiment of the device in which the hollow fiber bundle (71) is wrapped in a spiral fashion about a core (73) and passes through an aperture (72) in the core to form a U-shaped arrangement contained within case (79). The tubesheets (74) and (75) each are affixed and pass through apertures (76) and (77) in end plate (78). The feed liquid is introduced through tubesheet (75) at inlet (82) and the non-permeate is withdrawn through tubesheet (74) at outlet (83). The shellside fluid is introduced through inlet port (80) located in the side of the case and the shellside fluid and permeate is withdrawn through outlet port (81) located in end plate.

FIG. 9 illustrates an alternate embodiment of the invention in which two hollow fiber bundles (84) are wrapped in a spiral fashion about a core (85), the ends of which are embedded in tubesheets (86) and (87). The ends of the fiber bundles communicate through tubesheets (86) and (87) with header spaces (88) and (89). The feed liquid is introduced into header space (88) through inlet (120) and removed from header space (89) through outlet (121). The shellside fluid is introduced into the shellside via inlet (122) and removed via outlet (123).

FIG. 10 illustrates a fully assembled device, similar to the basic design illustrated in FIG. 6, which is operated in a counter-current flow mode. The feed liquid is introduced down the bores of the hollow fibers through tubesheet (91) at inlet (92) and exits through tubesheet (93) at outlet (94). The shellside fluid is introduced through port (95) and is withdrawn through port (96).

FIG. 11 illustrates a fully assembled device, similar to the basic design illustrated in FIG. 6, which is operated in a radial flow mode. The hollow fiber bundle (100) is wrapped in a spiral fashion about a perforated core (108). The feed liquid is introduced down the bores of the hollow fibers through tubesheet (101) at inlet (102) and exits through tubesheet (103) at outlet (104). The shellside fluid is introduced into the case through port (107) and is withdrawn through Port (106). Port (105) is blocked off.

FIG. 12 illustrates a fully assembled device, similar to the basic design illustrated in FIG. 6, which is operated under shellside vacuum. The feed liquid is introduced through tubesheet (111) at inlet (112) and exits through tubesheet (113) at outlet (114). Port (116) is blocked off and Port (115) is connected to a vacuum source.

What is claimed is:

1. A hollow fiber membrane device comprised of:
(1) a plurality of non-woven hollow fiber membranes formed into at least one non-random bundle wherein the membranes are capable of separating at least one of the components from a liquid feed mixture;
(2) at least one tubesheet comprised of a thermoplastic or thermoset material wherein the end(s) of the hollow fiber bundle(s) are embedded in the tubesheet(s);
(3) at least one core wherein at least one non-woven hollow fiber bundle is wrapped in a spiral fashion about at least one core in such a manner that the non-woven hollow fiber bundle(s) is first formed and then wrapped spirally about the core(s) as a completed bundle(s) such that the fibers comprising the bundle(s) may expand and contract without substantial damage to the fibers;
(4) a means for introducing the feed into the membrane device;
(5) a means for removing the non-permeate from the membrane device;
(6) a means for removing the permeate from the membrane device; and
(7) a case which contains the hollow fiber bundle(s), core(s) and tubesheet(s) wherein the case allows the hollow fibers to expand and contract without substantial damage to the fibers, wherein there is substantial void volume within the case external to the hollow fiber bundle(s) which is nonuniformly distributed.

2. The membrane device of claim 1 wherein the device is capable of accommodating longitudinal expansion of the hollow fiber bundle(s) of up to about 100 percent.

3. The membrane device of claim 2 wherein the minimum inner diameter of the case, $ID_{min}$ is defined by the equation:

$$ID_{min} = \frac{2D\sqrt{(1+s)^2 - \cos^2\theta}}{\sin\theta} - D + d'$$

wherein
D is the core diameter,
s is the maximum longitudinal swelling expressed as a fraction of the original fiber length,
d' is the diameter of the bundle after radial swelling, and
$\theta$ is the wrap angle.

4. The membrane device of claim 3 wherein the device is adapted with inlet and outlet means for a shell-side fluid.

5. The membrane device of claim 4 wherein the device is further comprised of end plates.

6. The membrane device of claim 5 wherein the core is a perforated tube.

7. The membrane device of claim 5 wherein the fiber bundle is wrapped in a spiral fashion about the core and passes through an aperture in the core to form a U-shaped configuration.

8. The membrane device of claim 5 wherein the device is comprised of two or more tubesheets.

9. The membrane device of claim 8 wherein the device is comprised of two or more fiber bundles.

10. The membrane device of claim 5 wherein the core is from about 15 to about 90 percent of the length of the hollow fibers.

11. The membrane device of claim 10 wherein each hollow fiber bundle contains between about 5 and 30,000 hollow fibers each.

12. The membrane device of claim 11 wherein the hollow fibers have a wall thickness of between about 20 and 200 microns.

13. The membrane device of claim 12 wherein the hollow fibers have an outer dimension of from about 100 to about 1000 microns.

14. The membrane device of claim 13 wherein the hollow fiber membranes are comprised of carboxy methyl cellulose; polyvinyl alcohol; sulfonated polyurea and salts thereof; aromatic polyamide; natural or synthetic rubbers including butyl or silicone rubber; or a perfluorosulfonic acid polymer or metal salt thereof.

15. The membrane device of claim 14 wherein the membrane is comprised of a polymer of perfluorosulfonic acid or metal salt thereof and is comprised of units which correspond to the formula

wherein
$R^1$ is independently in each occurrence fluorine or a $C_{1-10}$ perfluoroalkyl group;
$R^2$ is independently in each occurrence fluorine or a $C_{1-10}$ perfluoroalkyl group;
X is hydrogen or a metal;
z is an integer of from about 0 to about 6;
m is a positive real number of from about 5 to about 15;
p is an integer of from about 0 to about 16; and
q is an integer of from about 1 to about 16.

16. The membrane device of claim 15 wherein the tubesheet is comprised of a polyglycidyl ether of a polyhydric phenol, or resin thereof, and a curing agent.

* * * * *

UNITED STATES PATENT AND TRADEMARK OFFICE
CERTIFICATE OF CORRECTION

PATENT NO. : 4,902,416
DATED : February 20, 1990
INVENTOR(S) : Lawrence R. Schroeder, Terrence L. Caskey It is certified that error appears in the above-identified patent and that said Letters Patent is hereby corrected as shown below:

Col. 1, line 52, "means" has been misspelled;

Col. 1, lines 67-68, delete "follow" and insert -- hollow --;

Col. 4, lines 47-53, change Equations 2 and 3 as follows:

$$x = \frac{nD}{\tan\Theta} \qquad \text{Equation 2}$$

$$a = \frac{nD}{\sin\Theta} \qquad \text{Equation 3} \quad ;$$

Col. 6, line 59, "aliphatic" has been misspelled;

Col. 6, lines 64-65, "4-chlorophenylene" has been misspelled.

Signed and Sealed this

Seventeenth Day of December, 1991

Attest:

HARRY F. MANBECK, JR.

Attesting Officer

Commissioner of Patents and Trademarks